Feb. 10, 1942. D. W. MORRIS ET AL 2,272,678
SPEED CONTROL MECHANISM
Filed May 29, 1940 2 Sheets-Sheet 2
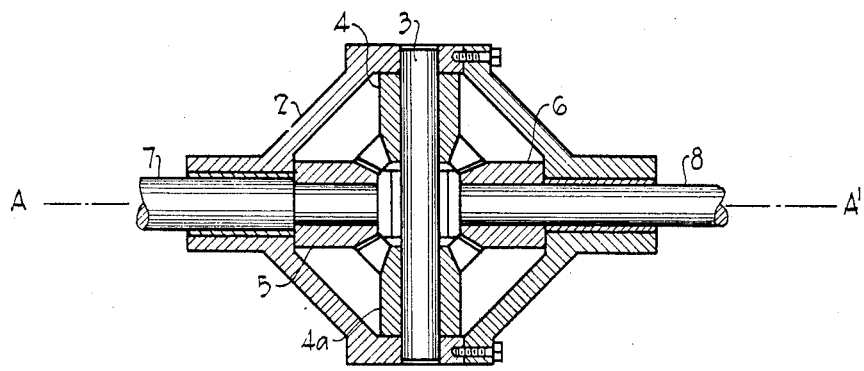
FIG. III
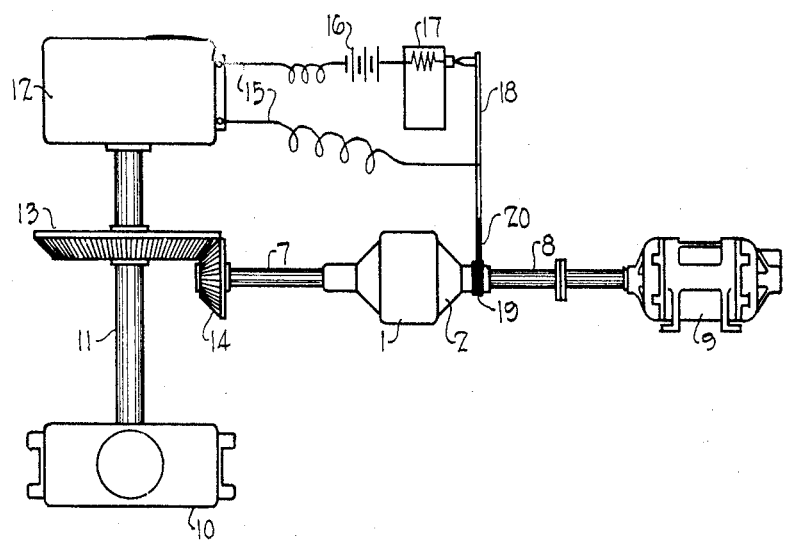
FIG. II
Inventors: Donald W. Morris
Alfred G. Cattaneo
By their Attorney: H. Birch Patented Feb. 10, 1942

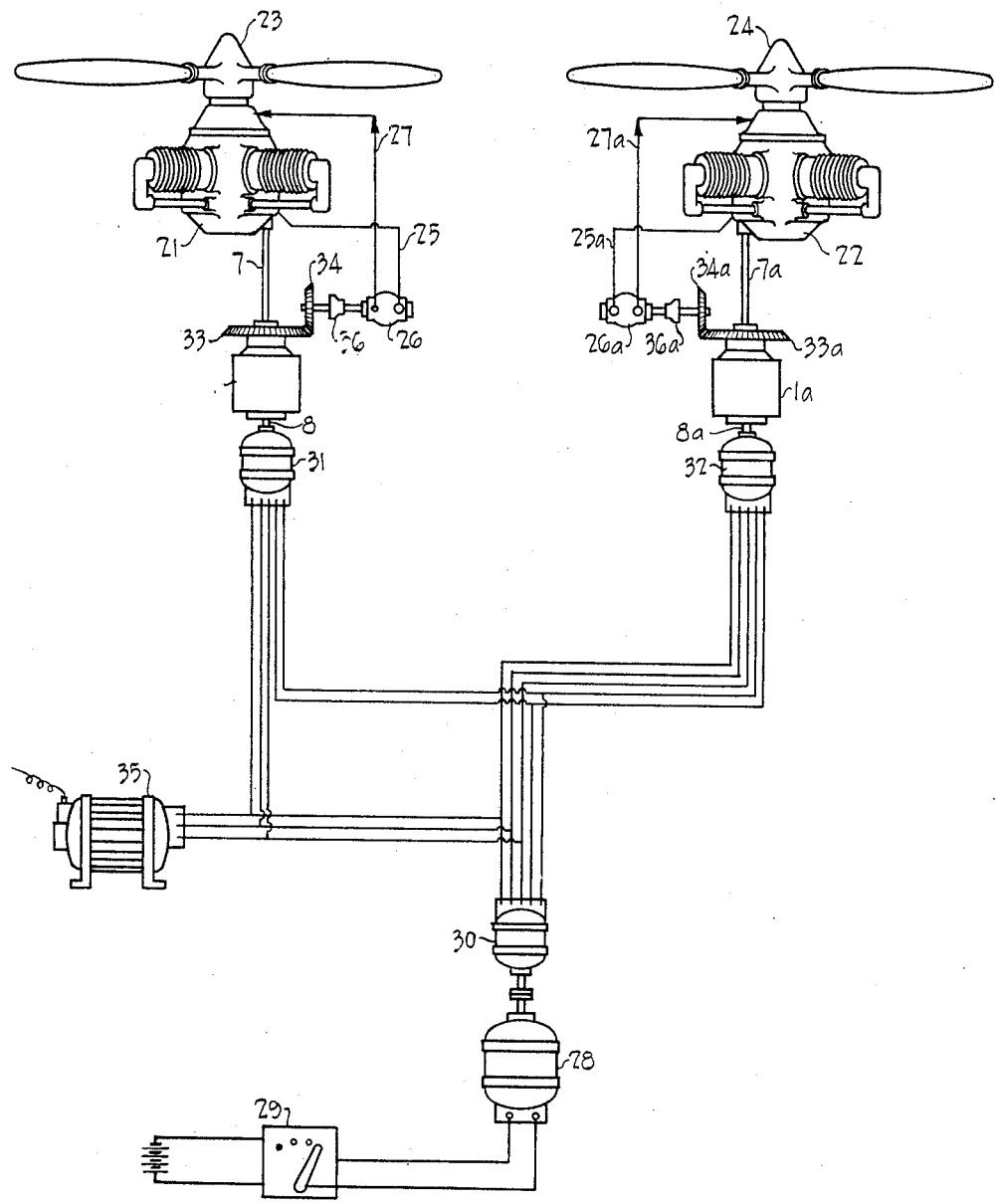
Fig. I

2,272,678

UNITED STATES PATENT OFFICE 2,272,678

SPEED CONTROL MECHANISM

Donald W. Morris and Alfred G. Cattaneo, Berkeley, Calif.

Application May 29, 1940, Serial No. 337,802

1 Claim. (Cl. 170—135.6)

The present invention relates to apparatus for speed control purposes, particularly to the exact control of the operating speed of internal combustion engines, electric generators, dynamometers, motor-generator sets and the like.

In operating any of the above mentioned equipment it is at times desirable and often necessary to control their operating speed. In the past this has been accomplished by means of various expedients such as centrifugal governors, pendulum governors, adjustable orifice valves, cam-throws and other similar devices. All of these mechanisms, however, have the same failing, i. e., they are insufficiently sensitive to very slight speed variations. As a result, they are not entirely satisfactory for certain applications of speed control wherein even very small variations are both noticeable and undesirable in their effect.

It is an object of the present invention to provide improved speed governing apparatus which is capable of detecting and correcting variations in speed. Further, it is an object of the invention to provide apparatus particularly adapted to correct speed variations of slight degree. Another object is to provide apparatus suitable for the exact synchronization of several motors or the like. Still further, it is an object to provide means whereby one or several motors may be controlled over any desired range of speeds. Other objects of the instant invention will be apparent from the following specification and description of the attached drawings.

Figure I is a diagrammatic layout of one arrangement for synchronizing the speeds of two internal combustion aircraft engines according to the invention.

Figure II is a diagrammatic sketch of one system for controlling the speed of a test engine or the like.

Figure III is an enlarged sectional elevation of a differential gear unit suitable for use according to the present invention.

In the drawings like parts are given like designations.

Referring particularly to Figure III, the differential unit comprises a housing 2 in which is mounted a spindle bearing 3. Idler gears 4 and 4a are mounted on spindle bearing 3 and engage two driven gears 5 and 6 mounted on shafts 7 and 8 respectively. It will be seen that if gears 5 and 6 are driven in opposite rotative directions at exactly the same speed, idler gears 4 and 4a, spindle bearing 3 and housing 2 will all maintain their respective positions with regard to the axis defined by shafts 7 and 8. On the other hand, if gears 5 and 6 are not rotating at exactly the same speed, gears 4 and 4a, spindle bearing 3 and housing 2 will rotate with respect to the common axis A, A¹ of shafts 7 and 8 in the rotational direction of the driven gear which is rotating the faster.

This principle is utilized as the basis for the present invention. Shaft 8, for example, may be driven by an electric motor and shaft 7 by the unit in which speed control is desired. The speed of shaft 8 being constant, any variation in the rotational speed of shaft 7 will cause a corresponding rotation of housing 2. The rotation of housing 2 is utilized to modify the working conditions of the unit to be controlled in a compensating manner.

A specific embodiment of such speed control system is shown in Figure II, wherein a differential gear unit 1 as shown in Figure I is connected with a synchronous motor 9 which drives shaft 8 at a given constant speed. A test engine 10, the speed of which is desired to control, is connected by its drive shaft 11 to an electrical dynamometer 12. A ring gear 13 mounted on shaft 11 engages a pinion gear 14 mounted on shaft 7 leading from the differential gear unit 1. A load circuit 15 for the electrical dynamometer 12 includes a source of current 16 and a rheostat 17. The rheostat control arm 18 is mounted on an extension 19 of the differential gear unit housing 2, the lower portion 20 of the rheostat control arm 18 being formed of insulating material. The ratio between gears 13 and 14 is such that when the test motor 10 is operating under optimum conditions with a given load on the dynamometer 12, shaft 7 will be driven at the same R. P. M. but in the opposite rotational direction as shaft 8 is driven by synchronous motor 9. Since the speed of shaft 8 is constant, any variations in speed of shaft 7, such as would be brought about by changes in the operating speed of test motor 10, will cause a corresponding movement of differential gear housing 2 and the extension 19 thereof on which the rheostat control arm 18 is mounted.

Thus, if the speed of test motor 10 increases, a corresponding increase in the speed of shaft 7 will take place, this in turn causing a rotational movement of differential gear housing and rheostat arm 18. The rheostat 17 and rheostat arm 18 are so arranged that a rotational movement of the arm 18 caused by an increase in the speed of test motor 10 will decrease the resistance of circuit 15 and as a result increase the load current supplied to the electrical dynamometer 12, such increase in load serving to reduce the speed of test engine 10. In a similar manner the dynamometer load will be decreased if the speed of test motor 10 falls below that corresponding to the relative R. P. M. of synchronous motor 9. In actual operation, a dynamometer control unit similar to that shown in Figure II has been found to maintain the speed of a test engine running at 2000 R. P. M. to within 4 R. P. M. under normal operating conditions.

By varying the speed of the synchronous motor 9 or utilizing different gear ratios as at 13 and 14, any desired operating speed of the test engine may be maintained, subject of course to the limitations imposed by the range of practical operating speeds for both the test engine and the synchronous motor. If the synchronous motor used at 9 is of the "Selsyn" type, shaft 8 may then be rotated at any desired speed without limitation. By the term "Selsyn" motors as used herein we mean motors of the type wherein the stator fields are supplied with A. C. current from a common source. Rotation of the rotor of any one of a number of interconnected "Selsyn" motors results in the generation of a rotor voltage of a phase angle and frequency that causes rotation of the other "Selsyn" motor rotors in synchronism with the master rotor.

In Figure I another embodiment of the invention is illustrated wherein the above discussed principle is utilized to synchronize the speeds of two or more aircraft engines. In the illustrated arrangement for accomplishing this, two aircraft engines 21 and 22 are provided with oil pressure controlled variable pitch propellers 23 and 24 respectively. Oil conduits 25 and 25a lead from a source of oil under pressure to valves 26 and 26a; thence to the propeller pitch controlling mechanism through conduits 27 and 27a. A variable speed motor 28, the speed of which is controlled by rheostat 29 drives the rotor of a master "Selsyn" type motor 30 which in turn supplies a rotor voltage to the rotors of synchronous motors 31 and 32 of a phase angle and frequency such as to maintain synchronism of the noted rotors with each other and with the rotor of master motor 30.

An A. C. current of fixed frequency is supplied to the stators of motors 30, 31 and 32 from a source of current 35 which may be, for example, a motor-generator set.

By adjustment of rheostat 29 it will be seen that the speeds of synchronous motors 31 and 32 may be varied as desired.

The synchronous motors 31 and 32 serve to drive shafts 8 and 8a of differential units 1 and 1a as described in relation to Figures II and III. Shafts 7 and 7a are driven by the engines 21 and 22, preferably through a reduction gearing system or in any suitable manner whereby the speed of rotation of shafts 7 and 7a will vary in direct proportion to the variation in R. P. M. of the engines. In place of the rheostat arm 18 shown in Figure II, ring gears 33 and 33a are mounted on the housings of differential units 1 and 1a. Gears 34 and 34a mounted on the stems of valves 26 and 26a respectively are adapted to engage ring gears 33 and 33a respectively. Friction clutches 36 and 36a are provided in the stems of valves 26 and 26a as a safety measure.

The operation of the synchronizing unit is as follows: If shafts 7 and 7a are driven at a speed equivalent to a given speed of synchronous motors 31 and 32 and consequently shafts 8 and 8a, ring gears 33 and 33a will remain stationary. However, if the speed of one of the engines increases or decreases, a corresponding increase or decrease in the rotational speed of shaft 7 or 7a will be effected. Any change in speed of the last mentioned shafts will cause rotation of the housings of differential units 1 and 1a and consequently a rotation of ring gears 33 and 33a. Such rotation will, through the action gears 34 and 34a, increase or decrease the flow of oil under pressure through valves 26 and 26a and to the variable pitch propeller mechanisms and thus in turn modify the pitch of the propeller blades. As is well known, a change in propeller pitch will serve to modify engine speed, an increase in propeller pitch bringing about a resultant decrease in engine R. P. M.

Since synchronous motors 31 and 32 will always operate in synchronism at any desired speed, being governed by the master motor 30, it will be seen that the differential units 1 and 1a, through adjustment of the variable pitch propeller mechanisms, will cause shafts 7 and 7a to rotate at identical speeds with respect to the respective synchronous motors and accordingly with respect to each other, thus effectively synchronizing the two motors. The rheostat 29 may be calibrated directly in engine speed if desired, the pilot thus having only to set the rheostat at any desired speed (within the range controllable by variable pitch propellers) and the engines will automatically remain in synchronization.

It is obvious of course that the same principle of control may be adapted to operate any other engine controls that will also modify engine speed, as for example, the throttle, boost pressure control electrically controlled variable pitch propellers, or the like. It is also obvious that any number of engines may be synchronized in a like manner.

Although the invention has been described particularly as a means for controlling the speed of various types of motors, it may equally well be used to control the speed of any one or more rotating shafts relative to the speed of a master controlling shaft.

Several of the more obvious applications for control of power absorption equipment to which the instant invention is particularly adaptable are control of current input to electrical dynamometers (as described above); valve control for hydraulic dynamometers; regulation of friction control utilizing of mechanical brakes. In the regulation of power delivery equipment the device may be used to operate, directly or indirectly, any of the various controls of the various types of engines, the current input to electric motors or the volume of steam or water supplied to a turbine.

For applications where a small electric motor as the control shaft drive is not practicable or where extreme accuracy is desired, a mechanical clock mechanism may be used as a drive. For example, on a stationary gasoline engine such as is often used in motor-generator sets, the control shaft may be driven by a clock mechanism wound by a vacuum motor utilizing the intake manifold vacuum. This will provide a speed control (through throttle control, for example) of zero average R. P. M. difference. The power required to drive the controlling shaft is small as it is only necessary to supply enough to overcome the slight amount of friction in the gears and operating control.

Although the differential unit has been described as a simple system of four intermeshing gears, it is obvious that modifications may also be used therein, as, for example, a friction drive gear system or a planetary gear differential will be found equally satisfactory.

A basic inherent advantage in the present control device over existing commonly used governing mechanisms is its positive response and sensitivity to even the slightest changes in speed in the unit to be controlled. The instant control units are simple in construction and relatively inexpensive. They are easily adaptable to use with any existing machinery that includes an element capable of modifying its speed. Further, the units are extremely flexible, i. e., they may be used to control mechanisms rotating at any speed from a few to thousands of revolutions per minute by the simple expedient of utilizing a reduction gear system when the operating speed range of the units are exceeded in either direction.

We claim as our invention:

Apparatus for synchronizing the operating speeds of a plurality of aircraft engines driving variable pitch propellers and including separate hydraulic motor means adapted to modify the pitch of said propellers individually, comprising a rotary valve in connection with each of said hydraulic pitch-changing motors, said rotary valves being arranged and adapted to control the liquid flow to said hydraulic pitch-changing motors and thereby control the pitch of said variable pitch propellers, conduit means between said rotary valves and their respective hydraulic pitch-changing motors, a differential unit in conjunction with each of said rotary valves, said differential units comprising in each instance a first and second driven element, idler elements connecting said driven elements and a member carried by said idler elements rotatable about the axis of said driven elements, driving means connecting said engines and said first driven elements of said differential units, power means arranged and adapted to rotate said second driven elements of said differential units in synchronism and in the reverse direction to the rotation imparted to said first driven elements, a ring gear mounted on each of said idler carried members, a rotatable actuating element in conjunction with each of said rotary valves, a pinion gear attached to each of said actuating elements, said pinion gears enmeshing their respective conjunctively disposed ring gears, a friction clutch mounted in each of said actuating elements between said pinion gears and said rotary valves, said ring gears being arranged and adapted to adjust the rotative disposition of their respective enmeshing pinion gears in accordance with the axial disposition of said idler carried members with respect to said aforementioned driven elements axes, thereby rotating said actuating elements and controlling the liquid flow through said rotary valves.

DONALD W. MORRIS.
ALFRED G. CATTANEO.